July 29, 1930. E. G. JEFFRIES 1,771,440
AXLE GREASE PROTECTIVE APPARATUS
Filed March 27, 1929

INVENTOR;
ELIJAH G. JEFFRIES,
BY Horace Barnes,
ATTORNEY.

Patented July 29, 1930

1,771,440

UNITED STATES PATENT OFFICE

ELIJAH G. JEFFRIES, OF PORTLAND, OREGON

AXLE-GREASE PROTECTIVE APPARATUS

Application filed March 27, 1929. Serial No. 350,184.

This invention relates to improvements in apparatus for protecting brake-linings of the rear wheel of automobiles from the intrusion of grease from the chambered casing of the differential apparatus.

As is well known the soft grease contained in quantities in the differential casing being constantly agitated during the actuation of the apparatus therein is commonly exuded from such container into the axle-housings or carried along the rotating axles to enter the brake-casings of the rear wheels and thus spread about the linings of the brake-bands with consequent serious diminution of the effectiveness of the brakes and causing serious danger in the operation of an automobile.

The present invention has for its object the provision of apparatus of simple and practicable construction to prevent in its totality the movement of grease along the rear-axles or axle-housings of an automobile through the application of self-acting devices to bar the access of grease into the housing either along the walls thereof or along the axle, and to force such grease as may enter the housing through an escape aperture provided in the housing therefor.

Other objects and advantages residing in my invention, and objects relating to details of construction and arrangement of parts thereof, will be readily apparent in the course of the detailed description to follow.

In the accompanying drawings, illustrating by way of example a representative form of my invention:

Figure 2:
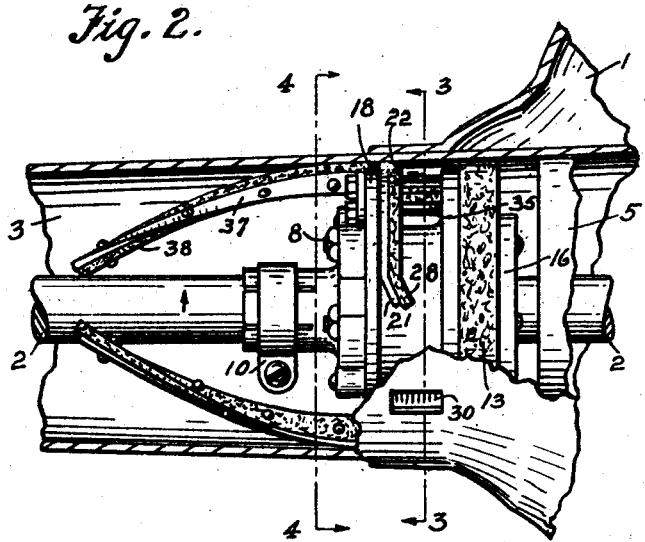
Fig. 2 is a view similar to Fig. 1 in side elevation.
Figure 3:
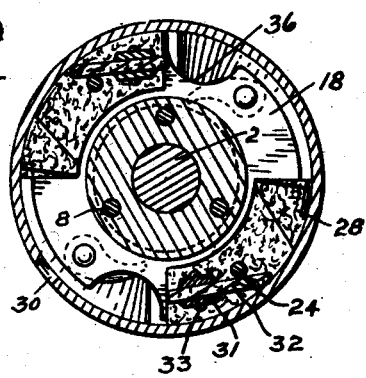
Fig. 3 is a view in cross-section on line 3—3 of Fig. 2.
Figure 1:
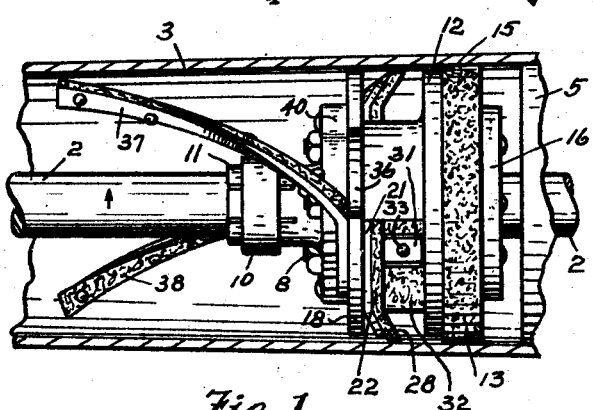
Fig. 1 is a fragmentary view in longitudinal section of a rear-axle housing and the axle therein, showing an embodiment of my invention operatively mounted therein in top plan.
Figure 4:
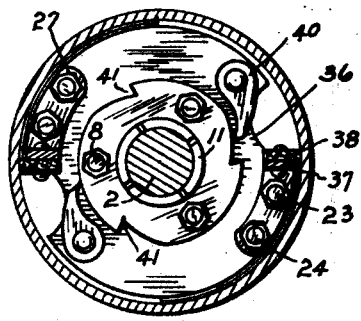
Fig. 4 is a view in cross-section on line 4—4 of Fig. 2.
Figure 5:
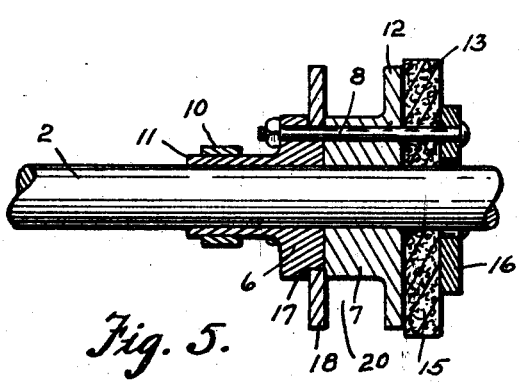
Fig. 5 is a detached view in vertical longitudinal section of the base-parts of my invention mounted upon one of the rear-axles.
Figure 6:
Figs. 6 and 7 are perspective views in detail of elements of the invention.
Figure 7:
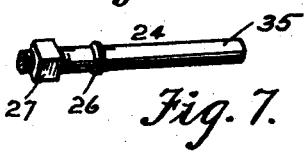

Referring to said views, the reference numeral 1 indicates the casing for the differential mechanism, not shown, of an automobile. A driven rear-axle of which there is one at each side of said casing is indicated at 2 extending axially of a tubular housing 3 rigidly connected to the differential casing in which a bearing 5 is mounted through which the axle is rotatably supported adjacent its inner end.

Circular blocks 6 and 7 are mounted upon the axle within the housing in proximity to the casing 1 and are rigidly connected together by bolts 8 extending therethrough. Such blocks are secured to the axle to rotate therewith by a clamp 10 encircling a split extension 11 of the outer block 6. The blocks 7 is formed with a peripheral flange 12 about its inner edge extending outwardly into proximity of the inner surface of the housing. Against the inner face of the block 7 and flange 12 a fibrous packing-disk 13 is positioned whose outer peripheral edge 15 is in pressed contact with the inner surface of the housing to serve as an initial barrier against the passage of grease along said surface. The disk 13 is secured to the block 7 by the bolts 8 passing through the disk and a keeper-plate 16 upon its inner side.

The outer block 6 is formed with an annular groove 17 where in conjunction with the adjoining outer edge of the block 7 a flat metal ring 18 is rotatably seated having its outer perimeter extended outwardly to about the same distance as the flange 12. Between said flange and ring a relatively deep-set annular channel 20 is formed in which the main grease-guarding elements are positioned.

Metal strips 21 of segmental form are secured to the inner side of the ring 18 each having a lining 22 of fibrous material on its inner side contacting along its outer edge with the housing wall. There are preferably two of said strips disposed symmetrically upon opposite sides of the channel 20 and they are rigidly secured by bolts 23 and 24 of which shoulders 25 and 26 respectively engage said strips while the shanks of said bolts pass through the ring and are secured on the outer side by nuts 27. Each said strip is formed with a wing 28 upon its rear end as it rotates with the axle in forward motion and is inclined to the plane of the ring to wipe any grease adhering to the housing or working up on the ring 18 inwardly and in line with an opening 30 formed in the housing midway of the channel 20 and communicating with the atmosphere.

The advance bolt 23 of each pair is formed on its inner end extending across the channel 20 with an enlarged and bifurcated portion 31 in whose slot a wiper-plate 32 is secured by a rivet 33. Said wiper-plates extend substantially across the channel 20 between the lining 22 and the opposite wall and engages the housing wall at its outer end at an angle that will effectively tend to plaster the grease in the channel through the opening 30 as the axle is rotated. Adjacent its outer end the wiper-plate bears upon the extension 35 of the rear bolt 24.

Recesses 36 are formed oppositely in the rim of the ring 18 intermediate the strips 21 and upon the outer side of the ring at the rear edge of each said recess spring-metal scraper-blades 37 are secured by the bolts 23 and 24. Said blades extend rearwardly in relatively flat spiral directions along the housing so that the blades will extend transversely at substantially right angles with the housing surface. Said blades are each provided with a lining 38 of fibrous or other suitable material in actual contact with the inner surface of the housing and tending to scrape all grease from the housing wall and work it inwardly along the spiral blades to exude inwardly through the apertures made by the recesses 36 into the channel 20.

Spring-pressed dogs 40 are pivotally mounted on the ring 18 engageable in notches 41 in the block 6 to cause the ring to partake of the rotary motion of the axle when the latter is travelling in a forward direction but which will be self-released on a contrary rotary direction of the axle taking place.

It will be apparent that the apparatus described and illustrated will be peculiarly effective in preventing the travel of grease along the axle or housing to enter the brake-casing where injurious effects upon the brakes would ensue. The grease from the differential chamber will first encounter the packing-disk 13 presenting a relatively broad barrier to the passing of grease thereby. The main barrier, however, is afforded by the channel 20 into which the grease must pass by overcoming the centrifugal effect of the parts revolving with the axle. As the grease extends outwardly of said channel it is subjected to the wiping action of the plates 32 which are positioned and directed to push the grease toward the housing wall and out of the opening 30. The wings 28, moreover, are provided to effectually work the grease away from the outer side of the channel and into the path of the wiper-plates 32 so that there is little likelihood for grease to cross such barrier.

Should the grease actually work past the channel 20 and along the housing-walls to the outer side of the ring 18 the spiral scraper-blades 37 will function to scrape the grease form the walls and in the fashion of a screw work the grease inwardly of the housing and through the apertures formed by the recesses 36 and into the channel where it will be disposed of by the wings 28 and the wiper-plates 32.

While I have described my invention with considerable attention to detail I do not wish to be understood as confining the invention to the precise construction set forth as it will be evident that various modifications in structure may be made without sacrificing the advantages sought and all such changes in detail are contemplated as within the spirit of the invention as are found to fairly lie within the scope of the following claims.

Having described my invention, what I claim as my invention, is:—

1. In apparatus of the class described, the combination with an axle and a tubular housing therefor having an opening in its side wall, of a body secured to the axle to rotate therewith formed with an annular channel, a packing-disk secured to said body blocking the passage of grease from the inner end of said housing to said channel, a ring mounted in said body secured against independent movement in the forward rotation of the body, a pair of strips rigidly secured on said ring each having a wing extending into said channel inclined from the forward direction of rotation of the body, a pair of wiper-plates mounted in said channel arranged to exude the grease through the opening in said housing, said ring having a pair of recesses in its periphery, and a spiral blade positioned upon the rear side of each said recess and extending outwardly along the axle in scraping engagement with the housing to collect grease therefrom and work the same inwardly through the respective recess.

2. In apparatus of the class described, the combination with an axle and a tubular housing therefor having an opening in its side wall, of a body secured to the axle to rotate therewith formed with an annular channel, a packing-disk secured to said body in operative engagement with the interior of said housing to block the passage of grease from the inner end of said housing to said channel, a ring mounted in said body secured against independent movement in the forward rotation of the body, a pair of strips rigidly secured on said ring each having a wing extending into said channel in inclined relation, and a pair of wiper-plates mounted in said channel arranged to force the grease through said opening.

3. In apparatus of the class described, the combination with an axle and a tubular housing therefor having an opening in its side wall, of a body secured to the axle to rotate therewith formed with an annular channel, a ring mounted in said body secured against independent movement in the forward rotation of the body, a pair of strips rigidly secured on said ring each having a wing extending into said channel in inclined relation, and a pair of wiper-plates mounted in said channel arranged to force grease through said opening.

4. In apparatus of the class described, the combination with an axle, and a tubular housing therefor having an opening in its side wall, of a body secured to the axle to rotate therewith formed with an annular channel, a plurality of wings connected to said body extending into said channel in inclined relation, and a plurality of wiper-plates mounted on said body in said channel disposed in inclined relation across said channel and adapted to force grease through said opening.

5. Grease protective apparatus for axles, consisting in combination with the axle, and a housing therefor formed with an opening in its side wall, of a cylindrical body secured for rotation with said axle having an annular channel therein, and a wiper-plate secured in said channel in an inclined plane and arranged to engage at its outer end with the wall of said housing to force the grease about the perimeter of said channel through said opening.

6. Grease protective apparatus for axles, as described in claim 5, together with a winged strip secured at one side of said channel and adapted to force grease towards the middle of the channel and in line with said opening.

7. Grease protective apparatus for axles, as set forth in claim 5, wherein at the outer side of said channel the body is formed with a plurality of apertures, and a spiral scraper-blade is secured at one side of each of said apertures and extends outwardly of the axle in scraping engagement with the housing wall.

ELIJAH G. JEFFRIES.